(No Model.)

W. S. GRIFFIN.
WAGON BRAKE.

No. 402,821. Patented May 7, 1889.

Witnesses:
E. P. Ellis,
Allen S. Pattison

Inventor:
W. S. Griffin,
per J. A. Lehmann,
Atty.

UNITED STATES PATENT OFFICE.

WILLIAM SIDNEY GRIFFIN, OF ATLANTA, TEXAS.

WAGON-BRAKE.

SPECIFICATION forming part of Letters Patent No. 402,821, dated May 7, 1889.

Application filed December 17, 1888. Serial No. 293,834. (No model.)

*To all whom it may concern:*

Be it known that I, WILLIAM SIDNEY GRIFFIN, of Atlanta, in the county of Cass and State of Texas, have invented certain new and useful Improvements in Wagon-Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in wagon-brakes; and it consists in the combination of a suitable support which is attached to the rear axle-tree, the brake which is pivoted to this support, the connecting-rod pivoted to the brake, and the operating-lever pivoted upon a supporting-bar which extends from one standard to the other, as will be more fully described hereinafter.

The object of my invention is to produce a wagon-brake which is simple in construction, effective in operation, and by means of which the driver can instantly apply the brake with great power.

Figure 1:
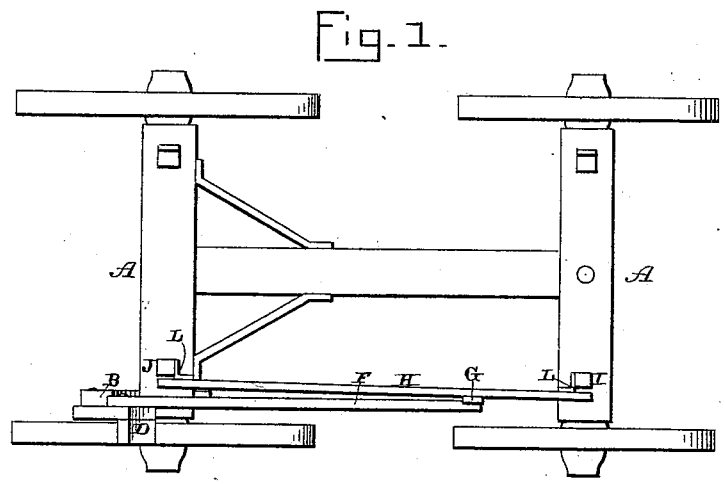
Figure 2:
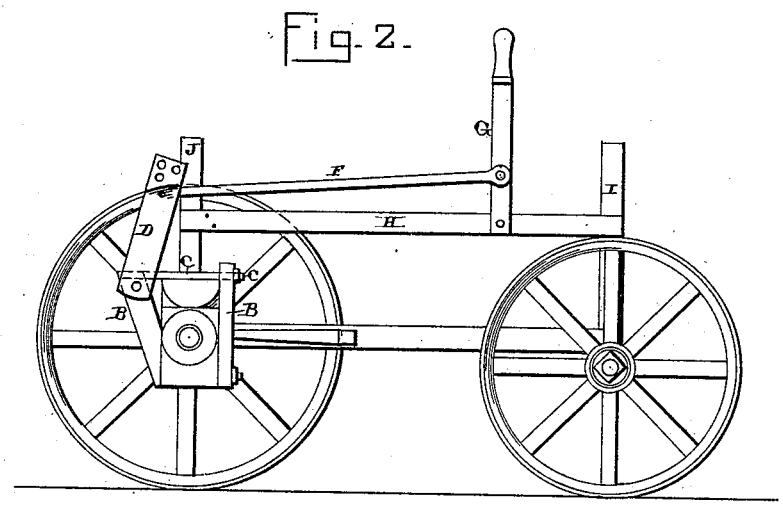

Figure 1 is a plan view of a wagon to which my brake is applied. Fig. 2 is a side elevation of the same, the near rear wheel being removed.

A represents an ordinary wagon, to the rear axle of which the U-shaped support B is applied. This support is made U-shaped, so as to project up upon both sides of the axle, and then the two prongs of the support have a clamping rod or bolt, C, passed through them, so as to hold the support in position. To one of the prongs of this support the brake D is pivoted, and this brake extends upward so as to operate upon the top edge of the wheel. Pivoted to this brake, at its rear end, is the connecting-rod F, and this rod is pivoted at its front end to the lever G, which is pivoted at its lower end to the supporting-rod H, which extends from one of the front standards, I, to the corresponding rear one, J. This rod forms a support for the lever, which extends up near the driver's seat, where it is within convenient reach. This rod is attached to the standards by bent metallic supports L, as shown.

The driver in pulling forward upon the upper end of the lever forces the upper end of the brake forward, so as to cause it to clamp the top of the wheel. By clamping the top of the wheel as here shown the wheel is pressed downward against the earth, and thus a brake is practicably applied to the wheel at two opposite points, thus enabling the driver to brake the wheel with sufficient force to prevent any possibility of its turning.

Having thus described my invention, I claim—

The combination of the rear axle, the support B, secured thereto, the brake D, pivoted upon the support, the rod F, lever G, the standards, and the supporting-rod H, upon which the lever G is pivoted, substantially as shown.

In testimony whereof I affix my signature in presence of two witnesses.

WILLIAM SIDNEY GRIFFIN.

Witnesses:
J. W. ERWIN,
R. A. WEIR.